(12) United States Patent
Peterson et al.

(10) Patent No.: US 10,346,634 B2
(45) Date of Patent: Jul. 9, 2019

(54) OBSCURING AND DELETING INFORMATION FROM A MESSAGING ACCOUNT

(71) Applicant: Lenovo (Singapore) Pte. Ltd., New Tech Park (SG)

(72) Inventors: Nathan J. Peterson, Durham, NC (US); Russell Speight VanBlon, Raleigh, NC (US); Arnold S. Weksler, Raleigh, NC (US); John Carl Mese, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 236 days.

(21) Appl. No.: 14/548,782

(22) Filed: Nov. 20, 2014

(65) Prior Publication Data
US 2016/0148014 A1 May 26, 2016

(51) Int. Cl.
 G06F 21/62 (2013.01)
 G06F 17/30 (2006.01)
 H04L 12/58 (2006.01)

(52) U.S. Cl.
 CPC .......... *G06F 21/6245* (2013.01); *H04L 51/22* (2013.01)

(58) Field of Classification Search
 CPC .......... G06F 21/6245; G06F 17/30522; H04L 51/14; H04L 51/22
 See application file for complete search history.

(56) References Cited

U.S. PATENT DOCUMENTS

| | | | |
|---|---|---|---|
| 8,046,831 B2 | 10/2011 | Porter et al. | |
| 2005/0021637 A1* | 1/2005 | Cox | G06Q 10/107 709/206 |
| 2006/0259948 A1 | 11/2006 | Calow et al. | |
| 2009/0019553 A1* | 1/2009 | Narayanaswami | H04L 63/10 726/28 |
| 2010/0042690 A1* | 2/2010 | Wall | H04L 51/046 709/206 |
| 2010/0154056 A1 | 6/2010 | Smith et al. | |
| 2012/0180134 A1* | 7/2012 | Coughtrey | G06F 21/606 726/26 |
| 2012/0324547 A1* | 12/2012 | Vidal | H04L 51/12 726/4 |
| 2013/0219453 A1 | 8/2013 | Balinsky et al. | |
| 2013/0246371 A1 | 9/2013 | Ahuja et al. | |
| 2013/0254831 A1 | 9/2013 | Roach et al. | |
| 2014/0033029 A1* | 1/2014 | Pittenger | G06F 17/24 715/271 |
| 2014/0181792 A1 | 6/2014 | Fanning et al. | |
| 2014/0282199 A1 | 9/2014 | Basu et al. | |

(Continued)

OTHER PUBLICATIONS

Google, "Keeping Data Secure With Data Loss Prevention (DLP) for Gmail", Dec. 9, 2015, http://googleappsupdates.blogspot.com/2015/12/keeping-data-secure-with-data-loss.html.

(Continued)

*Primary Examiner* — Noura Zoubair
(74) *Attorney, Agent, or Firm* — John L. Rogitz; John M. Rogitz

(57) ABSTRACT

In one aspect, a device includes a processor and a memory accessible to the processor. The memory bears instructions executable by the processor to access a messaging account and parse contents of the messaging account to identify personal information to at least obscure in the messaging account.

19 Claims, 7 Drawing Sheets

(56) References Cited

U.S. PATENT DOCUMENTS

2015/0012964 A1 1/2015 Xie et al.
2015/0118992 A1 4/2015 Wyatt et al.
2015/0199538 A1* 7/2015 Kritt .................. G06F 21/6245
726/26
2015/0358356 A1 12/2015 Diaz-Tellez et al.

OTHER PUBLICATIONS

Goran Hans Wibran, Richard Wayne Cheston, Russell Speight Vanblon, David Riveria, "Implementing File Security Settings Based on Context" related pending U.S. Appl. No. 14/633,573, non-final office action dated Jan. 29, 2016.

Goran Hans Wibran, Richard Wayne Cheston, Russell Speight Vanblon, David Riviera, "Implementing File Security Settings Based on Context", related pending U.S. Appl. No. 14/633,573. Final Office Action dated Jul. 15, 2016.

Nathan J. Peterson, Russell Speight Vanblon, Arnold S. Weksler, John Carl Mese, "Obscuring and Deleting Information from Messaging Account", related U.S. Appl. No. 14/633,573, Non-Final Office Action dated Jan. 25, 2017.

Goran Hans Wibran, Ruchard Wayne Cheston, Russell Speight Vanblon, David Rivera, "Implementing File Security Settings Based on Context", related U.S. Appl. No. 14/633,573, Applicant's response to Final Office Action filed Oct. 17, 2016.

Goran Hans Wibran, Richard Wayne Cheston, Russell Speight Vanblon, David Rivera, "Implementing File Security Settings Based on Context", related U.S. Appl. No. 14/633,573, Non-Final Office Action dated Nov. 2, 2017.

Goran Hans Wibran, Richard Wayne Cheston, Russell Speight Vanblon, David Rivera, "Implenting File Security Settings Based on Context", related U.S. Appl. No. 14/633,573, final office action dated Jun. 19, 2017.

* cited by examiner

Enter Personal Information to Search:

| | Obscure (402) | Delete Information (404) | Delete Message (406) |
|---|---|---|---|
| Number sequence(s) (408): [410] | ☐ | ☐ | ☐ |
| Password(s) (412): [414] | ☐ | ☐ | ☐ |
| Keyword(s) (416): [418] | ☐ | ☐ | ☐ |

Also search for:

| | Obscure (422) | Delete Information (424) | Delete Message (426) |
|---|---|---|---|
| ☐ (420) Social security number formats | ☐ | ☐ | ☐ |
| ☐ Bank account number formats | ☐ | ☐ | ☐ |
| ☐ Bank routing number formats | ☐ | ☐ | ☐ |
| ☐ Other loan/bank information | ☐ | ☐ | ☐ |
| ☐ Passwords | ☐ | ☐ | ☐ |
| ☐ Credit card number formats | ☐ | ☐ | ☐ |
| ☐ Health care/provider information | ☐ | ☐ | ☐ |

[ Submit ] (428)

FIG. 4

OBSCURING AND DELETING INFORMATION FROM A MESSAGING ACCOUNT

FIELD

The present application relates generally to obscuring and deleting information from a messaging account.

BACKGROUND

Often times sensitive information is sent via email and stored in an email account. Also often times, emails received at an email account are not permanently deleted, even after being read. If a person were to gain unauthorized access to an email account containing such sensitive information, many perils could ensue including e.g. identity theft.

SUMMARY

Accordingly, in one aspect a device includes a processor and a memory accessible to the processor. The memory bears instructions executable by the processor to access a messaging account and parse contents of the messaging account to identify personal information to at least obscure in the messaging account.

In another aspect, a method includes accessing messages in an account and parsing the messages to identify information to at least obfuscate in the account.

In still another aspect, a computer readable storage medium that is not a carrier wave includes instructions executable by a processor to access messages associated with a messaging account, identify information to at least one of obfuscate in the messages and remove from the messaging account, and at least one of obfuscate the information and remove the information from the messaging account.

The details of present principles, both as to their structure and operation, can best be understood in reference to the accompanying drawings, in which like reference numerals refer to like parts, and in which:

BRIEF DESCRIPTION OF THE DRAWINGS

FIGS. 4-8 are example user interlaces (UI) in accordance with present principles.

DETAILED DESCRIPTION

Figure 1:
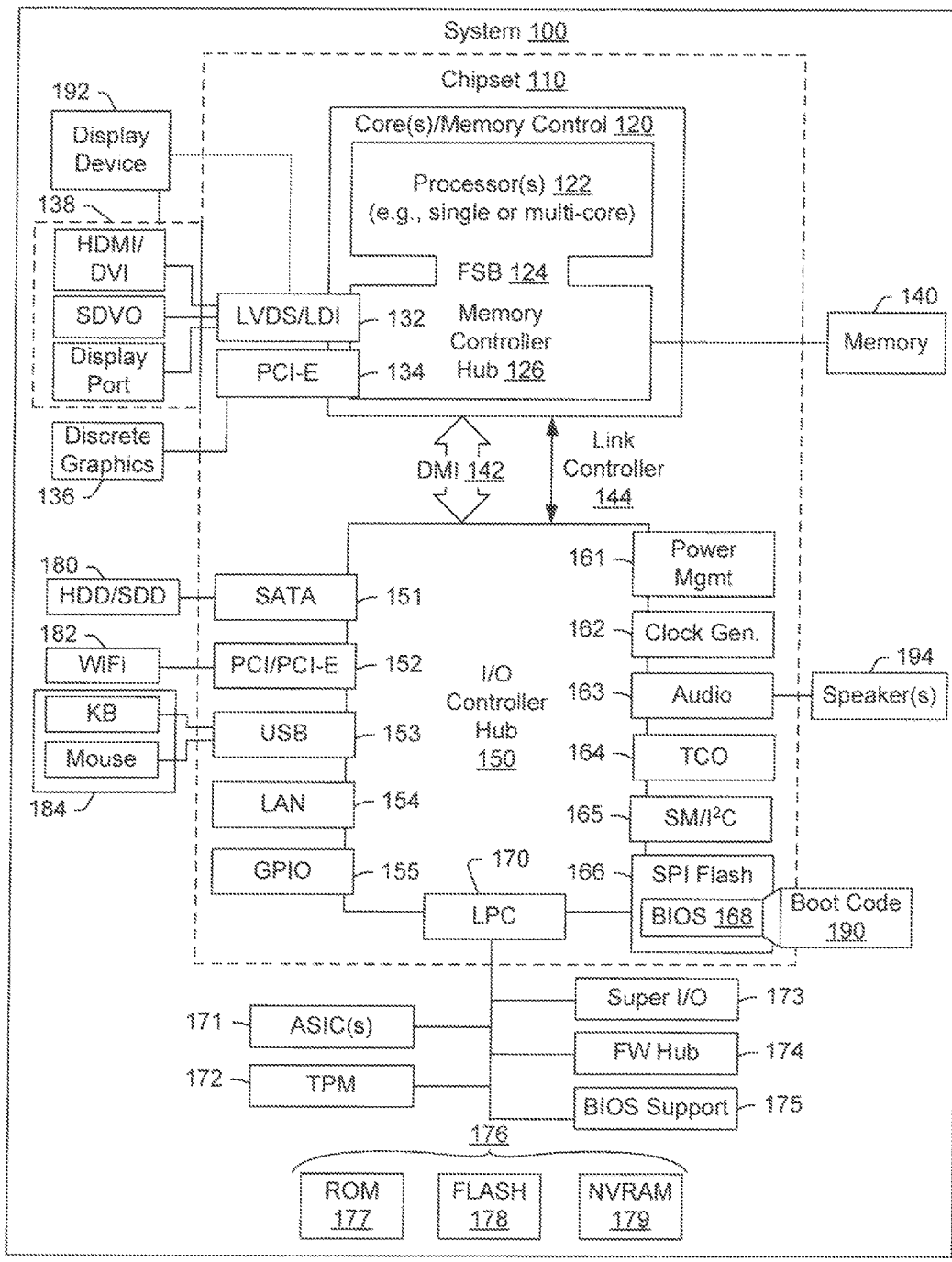
FIG. 1 is a block diagram of an example system in accordance with present principles.

This disclosure relates generally to device-based information. With respect to any computer systems discussed herein, a system may include server and client components, connected over a network such that data may be exchanged between the client and server components. The client components may include one or more computing devices including televisions (e.g. smart TVs, Internet-enabled TVs), computers such as desktops, laptops and tablet computers, so-called convertible devices (e.g. having a tablet configuration and laptop configuration), and other mobile devices including smart phones. These client devices may employ, as non-limiting examples, operating systems from Apple, Google, or Microsoft. A Unix or similar such as Linux operating system may be used. These operating systems can execute one or more browsers such as a browser made by Microsoft or Google or Mozilla or other browser program that can access web applications hosted by the Internet servers over a network such as the Internet, a local intranet, or a virtual private network.

As used herein, instructions refer to computer-implemented steps for processing information in the system. Instructions can be implemented in software, firmware or hardware; hence, illustrative components, blocks, modules, circuits, and steps are set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed, in addition to a general purpose processor, in or by a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Any software and/or applications described by way of flow charts and/or user interfaces herein can include various sub-routines, procedures, etc. It is to be understood that logic divulged as being executed by e.g. a module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (e.g. that may not be a carrier wave) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and twisted pair wires. Such connections may include wireless communication connections including infrared and radio.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

"A system having one or more of A, B, and C" (likewise "a system having one or more of A, B, or C" and "a system having one or more of A, B, C") includes systems that have A alone, B alone, C alone, A and B together, A and C together, B and C together, and/or A, B, and C together, etc.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, it shows an example block diagram of an information handling system and/or computer system 100. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be e.g. a game console such as XBOX® or Playstation®.

As shown in FIG. 1, the system 100 includes a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often, referred to as "system memory."

The memory controller hub 126 further includes a low-voltage differential signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including e.g. one of more CPUs). An example system may include AGP or PCI-E for support, of graphics.

The I/O hub controller 150 includes a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 provide for communication with various devices, networks, etc. For example, the SATA, interface 151 provides for reading, writing or reading and writing information on one or more drives 180 such as HDDs, SDDs or a combination thereof, but in any case the drives 180 are understood to be e.g. tangible computer readable storage mediums that may not be carrier waves. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Additionally, though now shown for clarity, in some embodiments the system 100 may include a gyroscope for e.g. sensing and/or measuring the orientation of the system 100 and providing input related thereto to the processor 122, an accelerometer for e.g. sensing acceleration and/or movement of the system 100 and providing input related thereto to the processor 122, an audio receiver/microphone providing input to the processor 122 e.g. based on a user providing audible input to the microphone, and a camera for gathering one or more images and providing input related thereto to the processor 122. The camera may be, e.g., a thermal imaging camera, a digital camera such as a webcam, and/or a camera integrated into the system 100 and controllable by the processor 122 to gather pictures/images and/or video. Still further, and also not shown for clarity, the system 100 may include a GPS transceiver that is configured to e.g. receive geographic position information from at least one satellite and provide the information to the processor 122. However, it is to be understood that another suitable position receiver other than a GPS receiver may be used in accordance with present principles to e.g. determine the location of the system 100.

Figure 2:
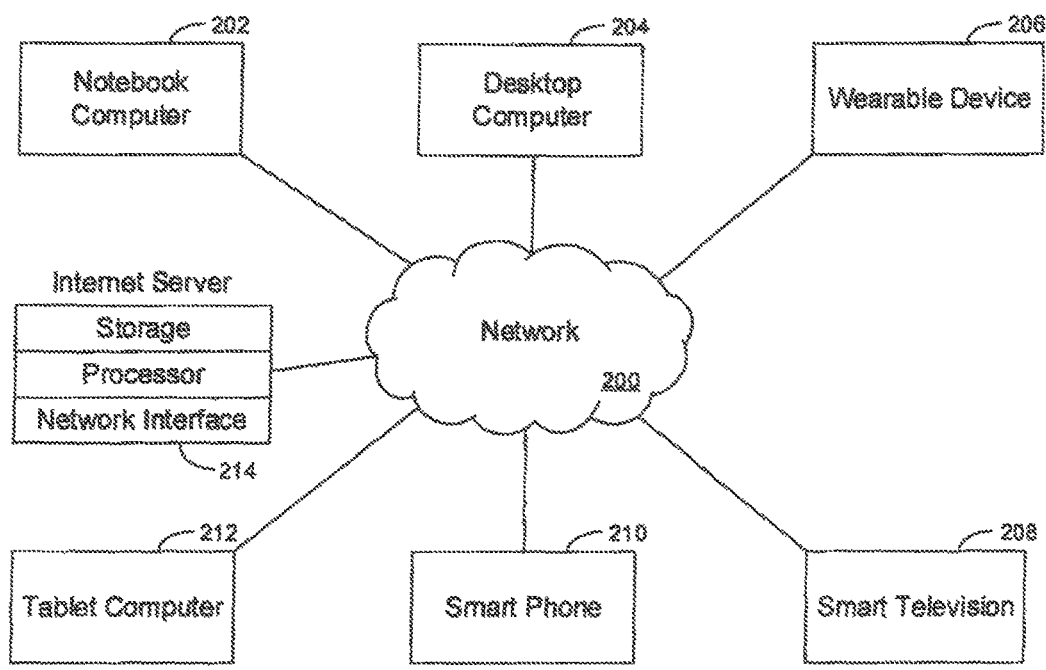
FIG. 2 is a block diagram of a network of devices in accordance with present principles.

Before moving on to FIG. 2, it is to be understood that an example client device or other machine/computer may include fewer or more features than shown on the system 100 of FIG. 1. In any case, it is to be understood at least based on the foregoing that the system 100 is configured to undertake present principles.

Turning now to FIG. 2, it shows example devices communicating over a network 200 such as e.g. the Internet in accordance with present principles. It is to be understood that e.g. each of the devices described in reference to FIG. 2 may include at least some of the features, components, and/or elements of the system 100 described above. In any case, FIG. 2 shows a notebook computer 202, a desktop computer 204, a wearable device 206 such as e.g. a smart watch, a smart television (TV) 208, a smart phone 210, a tablet computer 212, and a server 214 in accordance with present principles such as e.g. an Internet server that may e.g. provide cloud storage accessible to the devices 202-212. It is to be understood that the devices 202-214 are configured to communicate with each other over the network 200 to undertake present principles.

Figure 3:
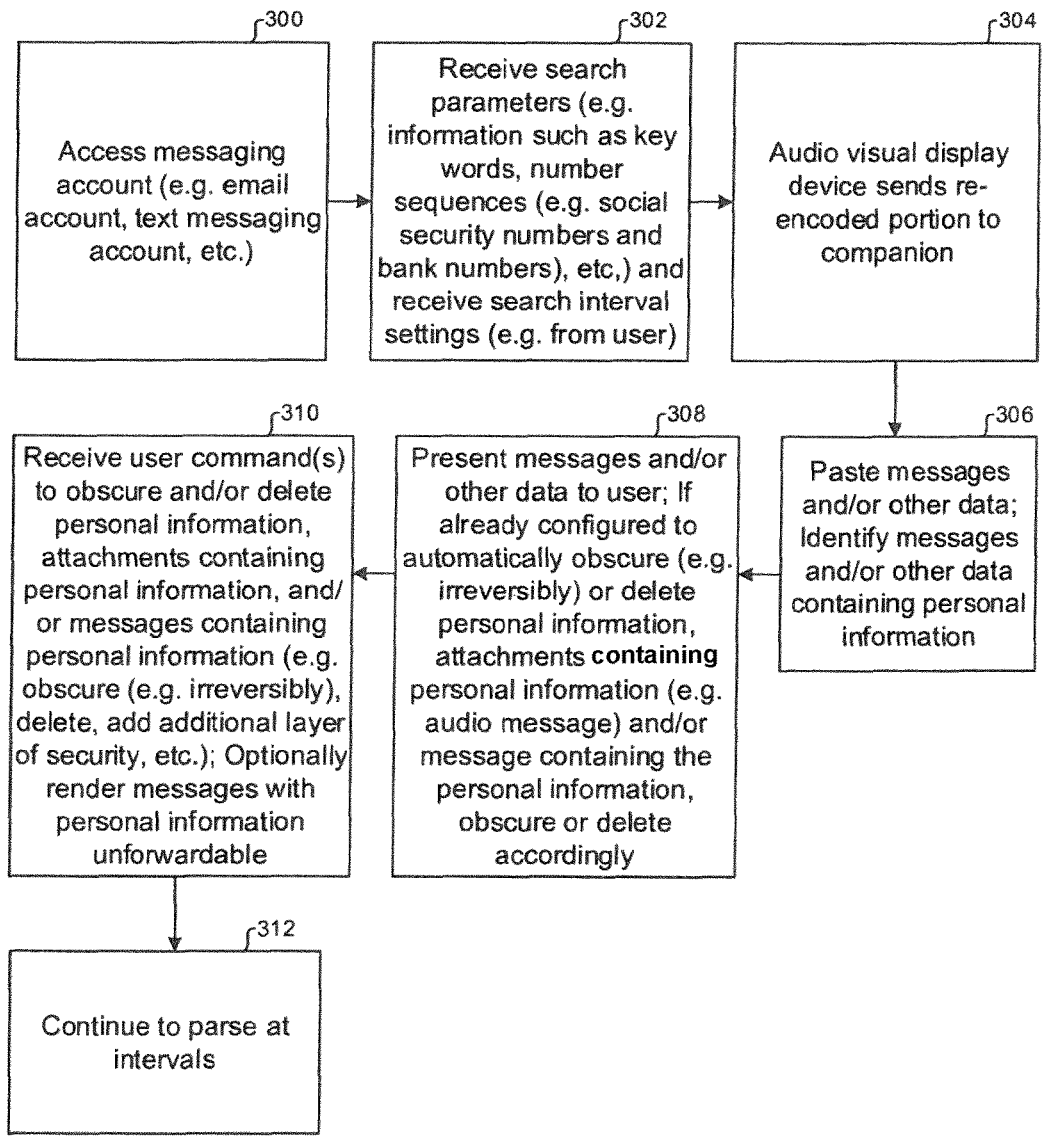
FIG. 3 is a flow chart showing an example algorithm in accordance with present principles.

Referring to FIG. 3, it shows example logic that may be undertaken by a device such as the system 100 in accordance with present principles. Beginning at block 300, the logic accesses a messaging account such as an email account (e.g. email accounts for which emails are stored locally on the system 100 itself and/or web based email accounts), a text messaging account, a social networking account, a chat and/or instant messaging account such as e.g. Google chat, an Internet messaging account, a messaging account affiliated with a particular holder of personal information (e.g. a banking application associated with a particular bank, a health care insurance application associated with a particular health care insurance provider, etc.), a video conferencing messaging account, etc. Regardless, it is to be understood that the logic may access the messaging account based on e.g. login information provided by a user.

After block 300 the logic proceeds to block 302 where the logic receives search parameters for searching for sensitive and/or personal information in the messaging account (e.g. contained in emails stored in and/or associated with the messaging account), such as e.g. key words to search, particular number sequences (e.g. a particular social security number which in some embodiments may include e.g. hyphens, a particular loan number, a particular bank account and/or routing number, etc.), and/or any of the other types of information disclosed herein. Also at block 302 the logic may receive search interval settings (e.g. from a user) pertaining to how often to conduct searches for the search parameters (e.g. automatically without a user providing a command to search for every search that is executed).

From block 302 the logic proceeds to block 304, at which the logic receives a command to search for messages and/or other data in the messaging account for personal information, sensitive information, etc. that meets and/or matches the parameters. In response to receipt of the command at block 304, the logic moves to block 306 where the logic parses and/or searches one or more messages and/or other data in the messaging account. Also at block 306 the logic identifies at least one and e.g. optionally all messages and/or other data containing information matching the search parameters. In response to identification of one or more messages or other data at block 306, the logic proceeds to block 308.

At block 308 the logic presents the identified messages and/or other data to a user such as e.g. on a display of a device undertaking the logic of FIG. 3 (referred to below as the "present device"). Also at block 308, if the present device has already been configured to automatically obscure (e.g. irreversibly) or delete personal information (e.g. information of a particular type, or particular information such as a specific social security number), attachments containing the personal information such as e.g. an audio message attachment that has been received at an email account, and/or the message itself which contains the personal information, the logic may obscure and/or delete according to those configurations.

After block 308 the logic proceeds to block 310 where the logic receives one or more user commands to obscure and/or delete personal information, attachments containing the personal information, and/or the messages containing the personal information. The commands may be received in response to e.g. selection of a user-selectable option to obscure or delete a message that was presented with the message at block 308. Examples of such options will be discussed further below.

Note that the command to obscure or delete the information, and the corresponding action, may be to irreversibly obscure the information in the message while not obscuring other portions of the message, deleting the entire message and thus the information, adding an additional layer of security and/or authentication to access and/or view the message containing the information (e.g. requiring an additional password, encrypting all or part of the message (e.g. encrypting the word comprising the sensitive and/or confidential information)), etc. Further, note that also at block 310 the logic may render messages with the personal information contained within them un-forwardable to others (e.g. to other messaging accounts), e.g. based on a user command and/or automatically. From block 310 the logic moves to block 312, where the logic continues to parse the messaging account at regular intervals as e.g. established by user so that as additional messages are received, any sensitive information contained within them may be identified and an action such as obscuring the message may accordingly be taken.

Before moving on, it is to be understood that in example embodiments, irreversibly obscuring means obscuring in such a way that the obscuring cannot be undone or "rolled back" but permanently obscures the information by e.g. replacing it with other data (e.g. text such as "redacted"), corrupting the portion of the file containing the information, etc. so that however irreversibly obscured, e.g. even the true owner of the messaging account cannot reverse or otherwise view something that has been irreversibly obscured.

Continuing the detailed description in reference to FIG. 4, it shows an example user interface (UI) 400 that may be presentable on a display of a device, such as the system 100, for undertaking present principles. The UI 400 is understood to pertain to inputting and/or customizing particular information and/or information types to identify when parsing a messaging account. Note that for each of the fields and/or options discussed below, a respective cheek box 402 may be selected to obscure the associated information, a respective check box 404 may be selected to delete the associated information from one or more messages, and a respective cheek box 406 may be selected to delete the message itself that contains the associated information.

Thus, a first option 408 is shown for a user to enter one or more particular number sequences into text entry box 410 for which to search, such as e.g. particular social security numbers or loan numbers. A second option 412 is shown for a user to enter one or more particular passwords (e.g. a sequence of characters) into text entry box 414 for which to search. A third option 416 is also shown on the UI 400, which is for a user to enter one or more key words into text entry box 418 for which to search.

As an example, suppose a user entered the password "TigerBlood" into text entry box 414, and the user also selected respective check box 402 for option 412. Upon the device identifying the character sequence "TigerBlood" in the body of a message, the device may automatically without additional user input obscure the portion of the message containing the character sequence "TigerBlood."

Still in reference to the UI 400 of FIG. 4, one or more additional options tor performing a "smart" search without receiving particular and/or specific e.g. number sequences and passwords from a user may also be provided. Note that each of these options may have a respective check box 420 associated therewith that is selectable by a user to configure the device to perform a search for information per the option. Also note that for each of these options, a respective check box 422 may be selected to obscure the associated information, a respective check box 424 may be selected to delete the associated information from one or more messages, and a respective check box 426 may be selected to delete the message itself that contains the associated information.

In any case, it may be appreciated from FIG. 4 that the aforementioned options may include searches for e.g. sequences of numbers in a social security number format (e.g. 555-55-5555), sequences of numbers in bank account number formats (e.g. including hyphens and spaces), sequences of numbers in bank account routing number formats, other loan and/or bank information (e.g. which may be searched for based on pre-programmed key words and/or parameters for identifying such information that may be been pre-programmed by e.g. a provider of software used for undertaking present principles), passwords (e.g. based on searching for the word "password" itself to identify a particular password that may follow the word "password"), sequences of numbers in credit card number formats, and/or health care and/or health care provider information (e.g. which also may be searched based on e.g. pre-programmed parameters). A submit selector element 428 is also shown on the UI 400 for submitting the selections and/or input provided to the UI 400 for parsing a messaging account accordingly.

Figure 5:
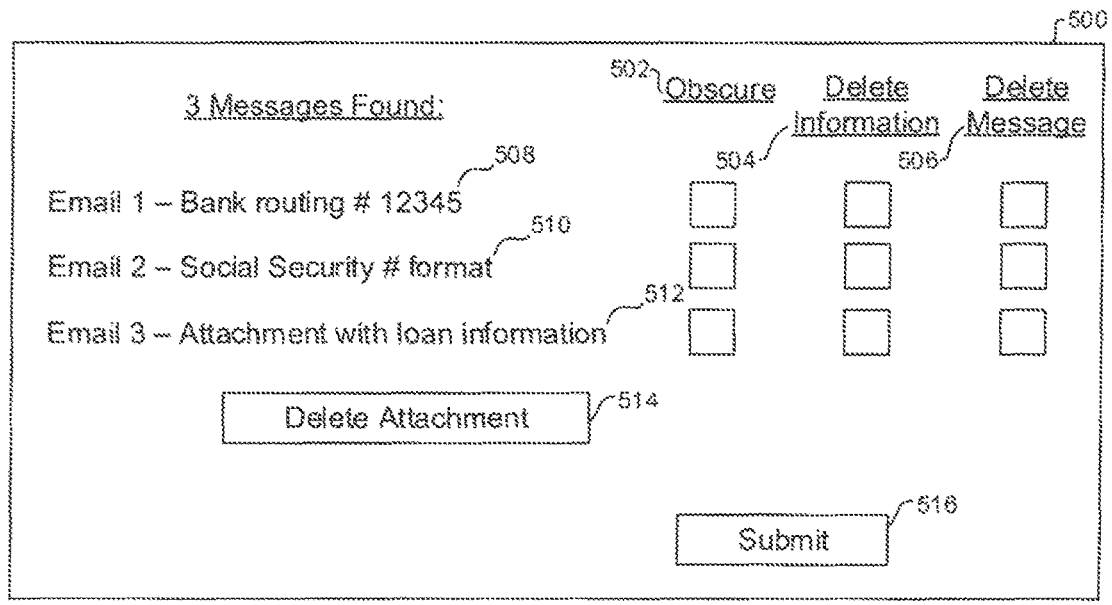

Now in reference to FIG. 5, a UI 500 is shown which presents a list of plural messages that have been identified as containing personal information in accordance with present principles. Note that for each of the messages shown, a respective check box 502 may be selected to obscure the identified information in the respective message, a respective check box 504 may be selected to delete the identified information from the respective message, and a respective check box 506 may be selected to delete the respective message itself that contains the identified information. In any case, a listing of three messages is shown in the present example. A first email 508 is indicated on the UI 500 as including a particular bank routing number "12345". A second email 510 is indicated on the UI 500 as including a number in a social security number format. A third email 512 is indicated on the UI 500 as including an attachment to the message with loan information contained in the attachment. Thus, a selector element 514 is presented that is selectable to automatically without further user input delete the attachment from the third email and/or from the messaging account.

Figure 6:
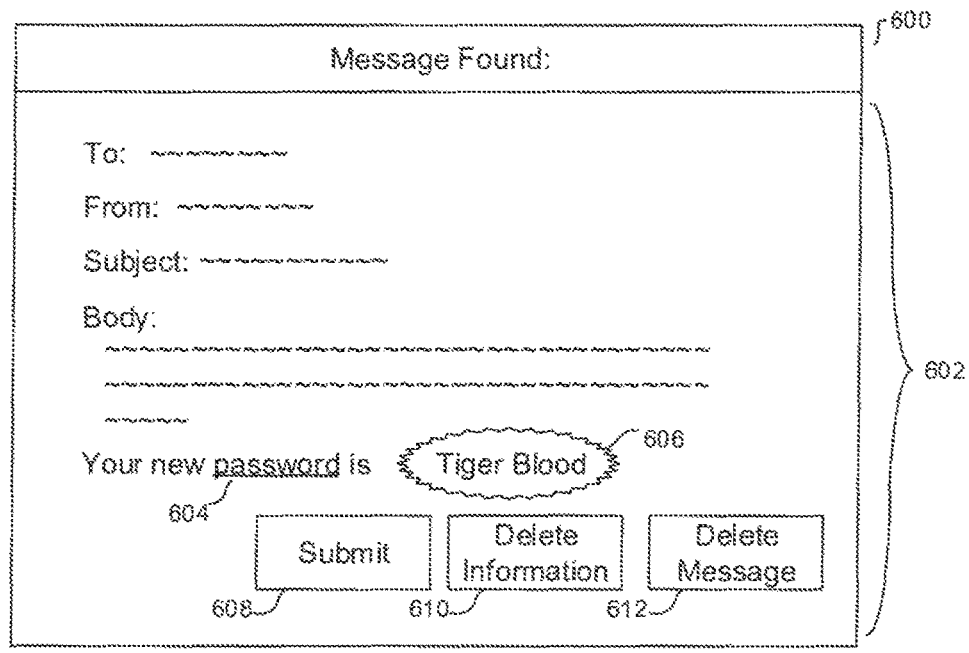

Before moving on to the description of FIG. 6, note that the UI 500 includes a submit selector element 516 for submitting the selections (e.g. one or more of boxes 502, 504, and 506) to perform an action on the email accordingly. Second, note that each of the emails as listed may have at least a portion of which that is selectable to automatically without further user input present the associated message itself which contains the identified information. Thus, the text noting the emails in the listing of FIG. 5 may be links to the emails themselves.

Now in reference to FIG. 6, it shows an example UI 600 presenting a particular message which has been identified to contain personal information e.g. conforming to a search parameter as set forth herein. The UI 600 may be presented e.g. in response to selection of a link to the message from a UI such as the UI 500 described above, may be presented in response to identification of the message itself as containing personal information, etc. Regardless, the UI 600 includes a message portion 602 displaying the identified message, including e.g. fields and associated text for a sender of the message, receiver of the message, subject of the message, and body of the message. Note that the body of the message at least contains the text "Your new pass word is Tiger-Blood." Also note that the word "password" has an indicator 604 associated therewith (in this case, "password" has been underlined) to denote that this word was the word identified as matching a parameter for the search of an email account containing the email represented on the UI 600. What's more, note that the password "TigerBlood" has been indicated with a bubble 606 to highlight that the bubbled portion contains the personal information to obscure or delete.

Still in reference to FIG. 6, the UI 600 also includes a selector element 608 selectable to automatically without further user input obscure the text "TigerBlood" from being viewed when the message is viewed (e.g. even when the associated email account is accessed from any device). A selector element 610 is also shown and is selectable to automatically without further user input delete the text "TigerBlood" from being viewed when the message is viewed, while a selector element 612 is shown which is selectable to automatically without further user input delete the entire message represented in FIG. 6.

Figure 7:
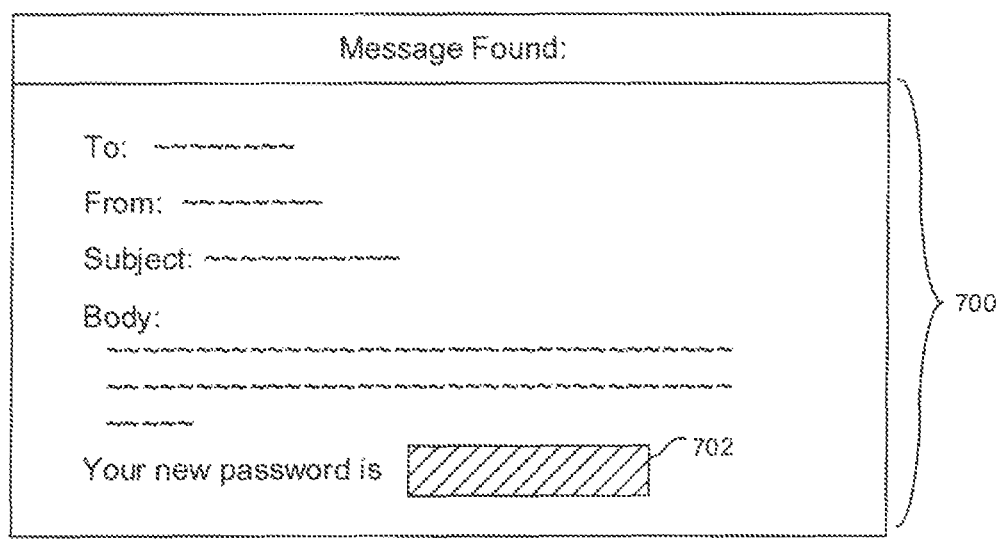

As may be appreciated from FIG. 7, another representation of the message also represented in FIG. 6 is shown in a portion 700. In contrast to FIG. 6, note that the text "TigerBlood" has been redacted with a bar 702 obscuring it from being viewed, which is how the message would be presented e.g. upon access of the message in the messaging account from my device subsequent to selection of the element 608. Note that while the redaction is shown as having a bar 702 the redaction effect need not necessarily be a bar but may more generally be e.g. an area of uniform color obscuring the text "TigerBlood" or another solid and/or block of area superimposed on the information to be obscured.

Figure 8:
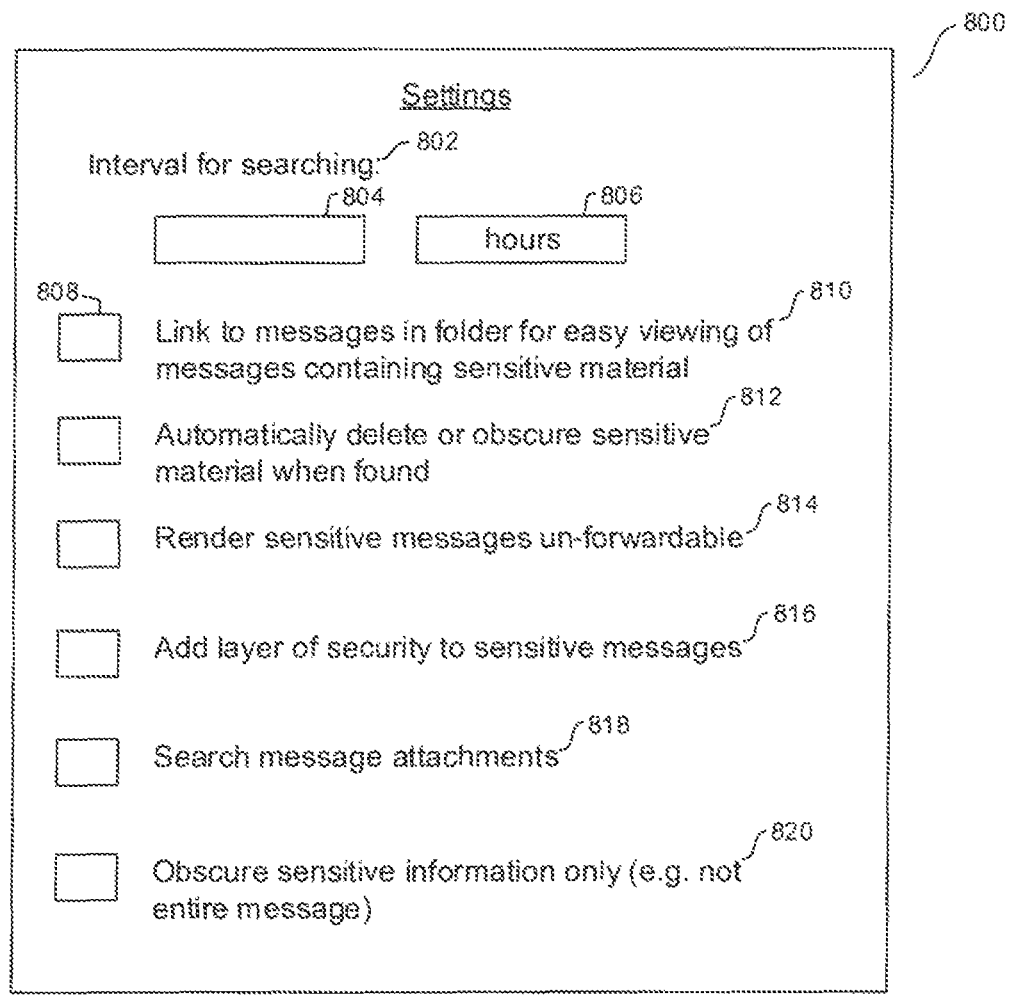

Moving on in the detailed description to FIG. 8, it shows an example UI 800 for configuring settings of an application for undertaking present principles. A first setting 802 is shown for establishing a time interval at which to search and/or parse a messaging account for personal information. An entry box 804 has thus been provided for a user to enter a number, as well as a time increment selector element 806, which reflects that the currently operative time increment is hours and which is selectable to change increments to e.g. seconds, minutes, days, etc.

The UI 800 of FIG. 8 includes still other settings, each of which may be respectively associated with a check box 808 for configuring the application to undertake an action associated with the setting. Thus, it is to be understood that the setting may be un-selected by unchecking the respective box 808 as well. In any case, a setting 810 is shown for linking in a folder to messages that have been identified as containing sensitive information in accordance with present principles so that a user may thus e.g. access a single folder to view a listing of all messages which have been identified and/or need review by a user. A setting 812 is shown for automatically without further user input than e.g. selecting the respective box 808 for the setting 812 delete and/or obscure sensitive information when identified (e.g. per settings for various types of information and particular information) such as may have been established e.g. using the UI 400 described above.

FIG. 8 also shows a setting 814 for rendering and/or configuring messages containing sensitive information to be un-forwardable from the associated email account, a setting 816 for adding a layer of security to messages identified as being sensitive (e.g. an additional authentication being required), a setting 818 for searching message attachments when parsing a messaging account for sensitive information, and a setting 820 for, when obscuring, obscuring sensitive information that has been identified rather than obscuring the entire message (e.g. redacting the entire message). Note that still other settings may be provided even though not shown in example FIG. 8, such as e.g. a setting for automatically deleting message attachments upon identification of them containing sensitive information (e.g. but not deleting or obscuring the rest of message).

Without reference to any particular figure, it is to be understood that should a message attachment be e.g. an attachment of audio, in lieu of deleting the entire attachment, if a device undertaking present principles parses the audio attachment and based on e.g. speech recognition determines that the audio attachment contains sensitive information, the portion of the audio attachment containing the sensitive information may be obscured by irreversibly muting or otherwise removing the portion of the audio with the sensitive information from the attachment.

Also without reference to any particular figure, the sensitive, confidential, personal, etc. information referenced and described herein may include, but is not limited to, social security number information, bank account number information, password information, loan information, credit card number information, health insurance information, medical record information, bank name information, credit card provider information, health insurance provider name information, healthcare provider name information, and bank routing number information.

Again without reference to any particular figure, it is to be understood that the logic and processes described herein may be performed by a particular device which has been configured to access a messaging account and/or profile, but may also be performed at a messaging account server, using a messaging application, and/or using the messaging account portal and/or client (e.g. if the messaging account is an Internet-based and/or cloud-service messaging account).

Additionally, it is to be understood that in some embodiments, if e.g. messages containing sensitive information are identified (and even e.g. sorted into a folder or otherwise categorized as confidential) and are not e.g. deleted based on a command from a user or based on settings, these messages (or at least the sensitive material therein) may be automatically obscured or deleted after a threshold time (e.g. established by a user). It may now be appreciated that present principles provide for e.g. email clients that are "pre-programmed" with the personal information of a user. The email client may then filter email based on the personal content within the email. Thereafter the user may sort the email based on whether or not it contains personal data. It is to be understood that once a user has "pre-programmed" the personal data (e.g. their social security number), this data may then be blocked from any person, (including the user) subsequently viewing it (to thus protect the saved search parameters themselves from being compromised). In such an embodiment, the user may nonetheless be allowed to add new values (e.g. a new embodiment, the user may nonetheless be allowed to add new values (e.g. a new social security number) and/or overwrite existing values.

Notwithstanding, it is to also be understood that in some embodiments, the email client may, with or without being "pre-programmed" with the user's personal data, search for keyword fields in the text or attachments of messages. For example, the client may search for "SSN:", "Bank Account Number:", "Checking Account:", etc. The client may also search for text or values that are the same number of digits or formatted like piece of sensitive information (e.g. a personal data object). An example would be a value formatted like a social security number or bank routing number.

Also, note that in some embodiments the user's personal data may be scanned and identified in messages e.g. in real-time as the messages are received at the messaging account, and responsive to being viewed a first time and/or by the user (e.g. as determined based on data from a camera and execution of facial recognition software thereon) and/or responsive to the message being closed a first time after a first opening, the personal data may be obfuscated, deleted, encrypted, etc. in accordance with present principles so that upon subsequent attempts to view the message contents the personal data is e.g. obfuscated (e.g. without the device having to search and/or parse the account to identify the personal data from an already-received message).

Before concluding, if is to be understood that although e.g. a software application for undertaking present principles may be vended with a device such as the system 100, present principles apply in instances where such an application is e.g. downloaded from a server to a device over a network such as the Internet. Furthermore, present principles apply in instances where e.g. such an application is included on a computer readable storage medium that is being vended and/or provided, where the computer readable storage medium is not a carrier wave and/or a signal per se.

While the particular OBSCURING AND DELETING INFORMATION FROM A MESSAGING ACCOUNT is herein shown and described in detail, it is to be understood that the subject matter which is encompassed by the present application is limited only by the claims.

What is claimed is:

1. A device, comprising:
a processor; and
storage accessible to the processor and bearing instructions executable by the processor to:
access a messaging account;
parse at least a first message of the messaging account to identify personal information to at least obscure in the first message, wherein the contents of the messaging account are parsed at intervals in response to a command to parse the contents of the messaging account at intervals to identify personal information to at least obscure in the messaging account;
permit access to the first message with personal information at least obscured; and
present at least one user interface (UI) on a display accessible to the processor, the UI comprising a setting that is selectable to configure the device to automatically obscure personal information in messages associated with the messaging account based on personal information being identified.

2. The device of claim 1, wherein the at least obscuring comprises deleting personal information from the messaging account.

3. The device of claim 1, wherein the instructions are further executable to:
in response to identification of at least some personal information to obscure in the first message, obscure the at least some personal information from being observed upon access to the first message by replacing the at least some personal information with text that does not indicate the at least some personal information itself.

4. The device of claim 1, wherein the instructions are further executable to:
in response to identification of at least some personal information in at least one attachment to the first message to obscure, obscure the at least some personal information in the at least one attachment from being observed upon access to the at least one attachment.

5. The device of claim 2, wherein the instructions are further executable to:
in response to identification of at least some personal information to delete from the messaging account, delete one or more messages containing the at least some personal information.

6. The device of claim 2, wherein the instructions are further executable to:
in response to identification of at least some personal information in a message attachment to delete from the messaging account, delete the attachment.

7. The device of claim 1, wherein the personal information is information selected from the group consisting of: social security number information, bank account number information, password information, loan information, credit card number information, health insurance information, medical record information, bank name information, credit card provider information, health insurance provider name information, healthcare provider name information, bank routing number information.

8. The device of claim 1, wherein at least the first message is parsed in response to a command from a user without further input from a user.

9. The device of claim 1, wherein the setting is selectable via selection of a selector element that is associated with the setting and that is presented on the UI.

10. The device of claim 1, wherein the UI is a settings UI.

11. A method, comprising:
accessing messages in an account; and
parsing the messages to identify, based on one or more of a particular numerical format and a particular number, personal information to at least obfuscate in the account; and
presenting, on a display, at least one user interface (UI), the UI comprising a setting that is selectable to enable automatic parsing of messages associated with the account to identify personal information to at least obfuscate, wherein the automatic parsing is enabled so that parsing is performed at predefined intervals.

12. The method of claim 11, wherein the UI is a UI for configuring settings related to parsing messages to identify information to at least obfuscate in the account.

13. The method of claim 11, comprising:
obfuscating personal information at least in part by corrupting portions of messages containing personal information.

14. The method of claim 11, comprising:
based on identification, in a first message, of personal information to at least obfuscate, sort the first message into a folder for messages that have been identified as having personal information.

15. A computer readable storage medium that is not a transitory signal, the computer readable storage medium comprising instructions executable by a processor to:
based on receipt of a first message at a messaging account, access the first message to identify information to at least one of obfuscate in the first message and remove from the first message; and
based on the first message being opened a first time, at least one of: obfuscate the information in the first message, and remove the information from the first message.

16. The computer readable storage medium of claim 15, wherein the instructions are executable to:
in response to identification of at least some of the information in the first message to at least one of obfuscate and remove from the messaging account, render the first message unable to be forwarded from the messaging account.

17. The computer readable storage medium of claim 15, wherein the instructions are executable by the processor to:
responsive to the first message being opened the first time, at least one of: obfuscate the information in the first message, and remove the information from the first message.

18. The computer readable storage medium of claim 15, wherein the instructions are executable by the processor to:
responsive to the first message being closed subsequent to being opened the first time, at least one of: obfuscate the information in the first message, and remove the information from the first message.

19. The computer readable storage medium of claim 15, wherein the instructions are executable by the processor to:
highlight the information while the first message is opened the first time, the highlighting being performed without obfuscating or removing the information from the first message.

* * * * *